United States Patent
Yonezawa et al.

(10) Patent No.: US 7,842,760 B2
(45) Date of Patent: Nov. 30, 2010

(54) LIQUID-CRYSTALLINE POLYESTER BLEND

(75) Inventors: Satoru Yonezawa, Osaka (JP); Motoki Asahara, Osaka (JP); Hisanari Fujiwara, Osaka (JP); Hiroaki Terada, Osaka (JP); Hiroyuki Kato, Osaka (JP)

(73) Assignee: Ueno Fine Chemicals Industry, Ltd., Osaka-Fu (JP)

( * ) Notice: Subject to any disclaimer, the term of this patent is extended or adjusted under 35 U.S.C. 154(b) by 0 days.

(21) Appl. No.: 12/260,536

(22) Filed: Oct. 29, 2008

(65) Prior Publication Data
US 2009/0111926 A1    Apr. 30, 2009

(30) Foreign Application Priority Data
Oct. 30, 2007    (JP) .............................. 2007-281827

(51) Int. Cl.
*C08G 63/08*    (2006.01)
*C08G 63/06*    (2006.01)
*C08F 290/06*    (2006.01)
*C08K 3/00*    (2006.01)
*C08K 3/10*    (2006.01)
*C08K 3/22*    (2006.01)
*C08K 3/34*    (2006.01)
*C08K 3/40*    (2006.01)
*C08K 3/04*    (2006.01)
*C04B 26/06*    (2006.01)
*C09K 3/10*    (2006.01)
*B60C 1/00*    (2006.01)

(52) U.S. Cl. .................. 525/450; 528/361; 524/81; 524/401; 524/413; 524/437; 524/444; 524/445; 524/495; 524/496; 524/494

(58) Field of Classification Search ................ 525/450, 525/437, 448; 524/494
See application file for complete search history.

(56) References Cited

U.S. PATENT DOCUMENTS

| | | | | |
|---|---|---|---|---|
| 4,161,470 A | * | 7/1979 | Calundann | ................... 524/599 |
| 7,531,222 B2 | * | 5/2009 | Terada et al. | ................. 428/1.1 |
| 2003/0008979 A1 | * | 1/2003 | Suenaga et al. | ............. 525/410 |
| 2004/0044169 A1 | * | 3/2004 | Yokota et al. | ................ 528/176 |
| 2007/0010647 A1 | * | 1/2007 | Ueno et al. | .................. 528/272 |
| 2007/0102667 A1 | * | 5/2007 | Terada et al. | ........... 252/299.01 |

* cited by examiner

*Primary Examiner*—Vasu Jagannathan
*Assistant Examiner*—Anthony H Sheh
(74) *Attorney, Agent, or Firm*—Sughrue Mion, PLLC

(57) ABSTRACT

The present invention provides a liquid-crystalline polyester blend, which is obtained by combining a liquid-crystalline polyester (A) and a liquid-crystalline polyester (B) such that the ratio by weight of (A)/(B) is 99/1 to 80/20:

liquid-crystalline polyester (A) which consists of aromatic oxycarbonyl repeating units, aromatic dioxy repeating units and aromatic dicarbonyl repeating units, and contains 40-80 mol % of the repeating unit represented by formula (I) based on the total repeating units constituting the liquid-crystalline polyester (A);

liquid-crystalline polyester (B) which comprises repeating units represented by formulae (I) and (II), wherein the molar proportion of the total amount of the repeating units represented by formulae (I) and (II) based on the total amount of the repeating units constituting the liquid-crystalline polyester (B) is greater than or equal to 90 mol % and the molar proportion of the repeating units represented by formulae (I) to (II) is from 10/90 to 50/50.

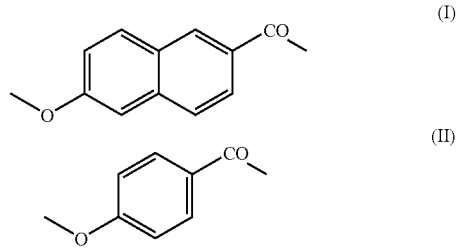

The liquid-crystalline polyester blend of the present invention exhibits excellent dielectric properties in high frequency regions as well as good impact strength and molding processability.

10 Claims, 1 Drawing Sheet

LIQUID-CRYSTALLINE POLYESTER BLEND

TECHNICAL FIELD

The present invention relates to a liquid-crystalline polyester blend which exhibits excellent dielectric properties in high frequency regions as well as good impact strength and molding processability.

BACKGROUND OF THE INVENTION

In modern societies, multimedia in daily life is rapidly developing and ITS (Intelligent Transport Systems) such as ETC device used in toll roads and GPS becomes widely used. In order to treat the extraordinary increase of information and telecommunications technologies, the frequency of signals used for the transmission is becoming higher.

As material used for the information communication devices employing such a high frequency, engineering plastics which exhibit excellent dielectric properties in high frequency regions (especially in gigahertz bands) attract attention. The engineering plastics also exhibit good productivities and lightweight properties and therefore, they are expected to be applied for chassis and package of communication devices and electronic devices as well as for dielectric body and the like.

Among the engineering plastics, thermotropic liquid-crystalline polyester resin (which is called as liquid-crystalline polyester resin or LCP hereinafter) has the following excellent properties and is especially expected to be suitable for manufacturing devices which use high frequency signals:

(1) excellent dielectric properties: the relative permittivity ($\in r$) is constant in the frequency regions employed and dielectric loss tangent (tan δ) is small,
(2) good physicalities: mechanical properties including low-expansion property (dimensional stability), heat resistance, flame retardancy and rigidity are good, and
(3) good molding flowability: which allows processing of molded articles having down-sizing and thinner parts.

Among the liquid-crystalline polyester resins, liquid-crystalline polyesters comprising a large amount of a repeating unit derived from 6-hydroxy-2-naphthoic acid are recently proposed because they exhibit good heat resistance and dielectric properties (see US Patent Application Publication No. 2004-152865, Japanese Patent Application laid open No. 2007-154169 and US Patent Application Publication No. 2004-044169).

The liquid-crystalline polyesters disclosed in the above three references include a great amount of 6-hydroxy-2-naphthoic acid as aromatic hydroxycarboxylic acid. Though such liquid-crystalline polyesters exhibit excellent dielectric properties, their impact strength is relatively poor.

With regard to a liquid-crystalline polyester resin disclosed in US Patent Application Publication No. 2004-044169 which comprises a large amount of 6-hydroxy-2-naphthoic acid and a small amount of p-hydroxybenzoic acid as aromatic hydroxycarboxylic acids, it has a problem in relation to molding processability because it exhibits a high melting temperature.

Accordingly, a liquid-crystalline polyester resin which exhibits excellent dielectric properties as well as good impact strength and molding processability is desired.

SUMMARY OF THE INVENTION

An object of the present invention is to provide a liquid-crystalline polyester blend which exhibits excellent dielectric properties in high frequency regions as well as good impact strength and molding processability.

The present invention provides a liquid-crystalline polyester blend, which is obtained by combining a liquid-crystalline polyester (A) and a liquid-crystalline polyester (B) such that the ratio by weight of (A)/(B) is 99/1 to 80/20:

liquid-crystalline polyester (A) which consists of aromatic oxycarbonyl repeating units, aromatic dioxy repeating units and aromatic dicarbonyl repeating units, and contains 40-80 mol % of the repeating unit represented by formula (I) based on the total repeating units constituting the liquid-crystalline polyester (A);

liquid-crystalline polyester (B) which comprises repeating units represented by formulae (I) and (II), wherein the molar proportion of the total amount of the repeating units represented by formulae (I) and (II) based on the total amount of the repeating units constituting the liquid-crystalline polyester (B) is greater than or equal to 90 mol % and the molar proportion of the repeating units represented by formulae (I) to (II) is from 10/90 to 50/50.

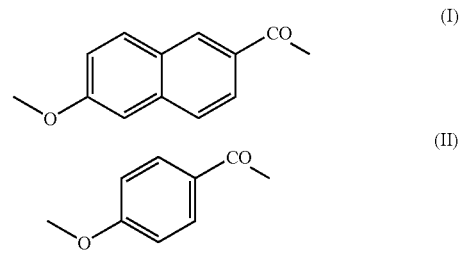

DETAILED DESCRIPTION OF THE PREFERRED EMBODIMENTS

Figure 1:
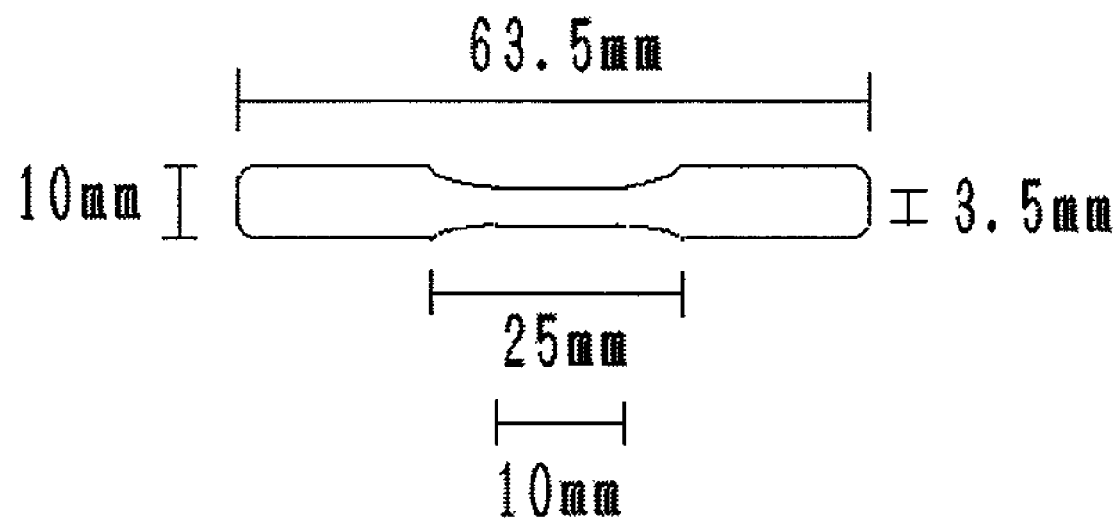
FIG. 1 is a schematic representation of the dumbbell-shaped specimen used for the tensile strength test.

The liquid-crystalline polyester (A) and liquid-crystalline polyester (B) contained in the liquid-crystalline polyester blend of the present invention are liquid-crystalline polyesters which exhibit anisotropic melt phase and are called as thermotropic liquid-crystalline polyester by those skilled in the art.

The anisotropic melt phase can be confirmed by means of conventional polarized light system using orthogonal light polarizer. In more detail, the sample on the hot stage under nitrogen atmosphere may be observed.

The liquid-crystalline polyester (A) used for the present invention consists of aromatic oxycarbonyl repeating units, aromatic dioxy repeating units and aromatic dicarbonyl repeating units and contains 40-80 mol %, preferably 45-70 mol %, and more preferably 50-65 mol % of the repeating unit represented by formula (I) based on the total repeating units constituting the liquid-crystalline polyester (A).

The liquid-crystalline polyester consisting of the above described repeating units may include both of those give anisotropic melt phase and those do not, depending on structural components of the polyester, and ratio and sequence distribution of the components. The liquid-crystalline polyester used for the present invention is limited to those exhibit anisotropic melt phase.

The liquid-crystalline polyester (A) used for the present invention must contain the repeating unit represented by formula (I) as an aromatic oxycarbonyl repeating unit. Examples of monomers which provide the repeating unit represented by formula (I) are 6-hydroxy-2-naphthoic acid as well as ester forming derivatives such as acyl derivatives, ester derivatives and acid halide thereof.

Examples of monomers which provide aromatic oxycarbonyl repeating units other than the repeating unit represented by formula (I) are aromatic hydroxycarboxylic acids such as 4-hydroxybenzoic acid, 3-hydroxybenzoic acid, 2-hydroxybenzoic acid, 5-hydroxy-2-naphthoic acid, 3-hydroxy-2-naphthoic acid, 4'-hydroxyphenyl-4-benzoic acid, 3'-hydroxyphenyl-4-benzoic acid, 4'-hydroxyphenyl-3-benzoic acid and alkyl-, alkoxy- or halogen-substituted derivatives as well as ester forming derivatives such as acyl derivatives, ester derivatives and acid halide thereof.

The liquid-crystalline polyester (A) contains preferably 40-80 mol %, more preferably 45-70 mol % and even more preferably 50-65 mol % of aromatic oxycarbonyl repeating units based on the total repeating units constituting the liquid-crystalline polyester (A).

Preferably, the aromatic oxycarbonyl repeating unit contained in the liquid-crystalline polyester (A) is solely the repeating unit represented by formula (I).

Examples of monomers which provide aromatic dioxy repeating units are aromatic diols such as hydroquinone, resorcin, 2,6-dihydroxynaphthalene, 2,7-dihydroxynaphthalene, 1,6-dihydroxynaphthalene, 1,4-dihydroxynaphthalene, 4,4'-dihydroxybiphenyl, 3,3'-dihydroxybiphenyl, 3,4'-dihydroxybiphenyl, 4,4'-dihydroxybiphenyl ether and alkyl-, alkoxy- or halogen-substituted derivatives as well as ester forming derivatives such as acyl derivatives thereof.

Among the aromatic dioxy repeating units derived from the above described monomers, aromatic dioxy repeating units constituting the liquid-crystalline polyester (A) is preferably one or more repeating units selected from the group consisting of the repeating units represented by the following formulae (1) to (3) in terms of controlling melting point and the like of the resulting liquid-crystalline polyester (A).

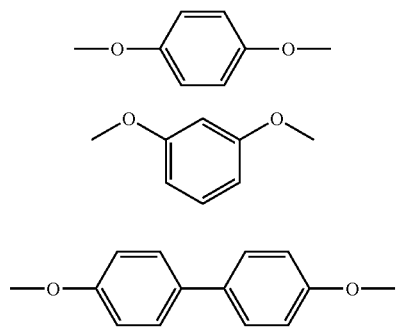

Further, among the liquid-crystalline polyester (A) comprising aromatic dioxy repeating units represented by the above formulae (1) to (3), those which contain the repeating unit represented by formula (3) in an amount of greater than or equal to 50 mol % based on the total amount of the aromatic dioxy repeating units is preferable in terms of good heat resistance and mechanical properties of the resulting liquid-crystalline polyester (A). The amount of the repeating unit represented by formula (3) based on the total amount of the aromatic dioxy repeating units is more preferably 80-99.9 mol %, even more preferably 85-99 mol % and the most preferably 90-98 mol %.

Examples of monomers which provide aromatic dicarbonyl repeating units are aromatic dicarboxylic acids such as terephthalic acid, isophthalic acid, 2,6-naphthalenedicarboxylic acid, 1,6-naphthalenedicarboxylic acid, 2,7-naphthalenedicarboxylic acid, 1,4-naphthalenedicarboxylic acid, 4,4'-dicarboxybiphenyl and alkyl-, alkoxy- or halogen-substituted derivatives as well as ester forming derivatives such as ester derivatives and acid halide thereof.

Among the aromatic dicarbonyl repeating units derived from the above described monomers, aromatic dicarbonyl repeating units constituting the liquid-crystalline polyester (A) preferably include one or more repeating units selected from the group consisting of the repeating units represented by the following formulae (4) to (6) in terms of controlling mechanical properties, heat resistance, melting point and molding processability of the resulting liquid-crystalline polyester (A).

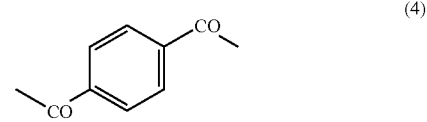

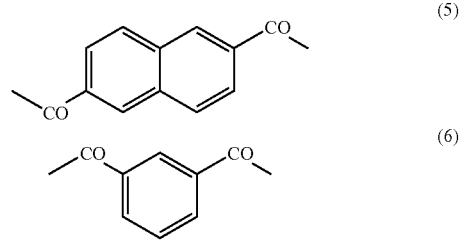

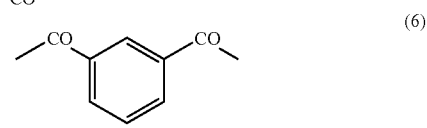

In the liquid-crystalline polyester (A), the relative molar proportion of aromatic dioxy repeating units to aromatic dicarboxy repeating units is preferably from 9/10 to 10/9 and more preferably from 95/100 to 100/95.

The liquid-crystalline polyester (A) used for the present invention may be a combination of two or more liquid-crystalline polyesters and may be a liquid-crystalline polyester blend which is obtained by melt kneading two or more liquid-crystalline polyesters as long as each of the constituting liquid-crystalline polyesters consists of aromatic oxycarbonyl repeating units, aromatic dioxy repeating units and aromatic dicarbonyl repeating units and contains 40-80 mol % of the repeating unit represented by formula (I) based on the total repeating units constituting the each liquid-crystalline polyester.

Examples of the preferable combinations of repeating units constituting the liquid-crystalline polyester (A) are listed below:

1) 6-hydroxy-2-naphthoic acid/4,4'-dihydroxybiphenyl/hydroquinone/terephthalic acid copolymer;
2) 6-hydroxy-2-naphthoic acid/4,4'-dihydroxybiphenyl/hydroquinone/2,6-naphthalenedicarboxylic acid copolymer
3) 6-hydroxy-2-naphthoic acid/4,4'-dihydroxybiphenyl/hydroquinone/isophthalic acid copolymer
4) 6-hydroxy-2-naphthoic acid/4,4'-dihydroxybiphenyl/resorcin/terephthalic acid copolymer
5) 6-hydroxy-2-naphthoic acid/4,4'-dihydroxybiphenyl/resorcin/2,6-naphthalenedicarboxylic acid copolymer 6) 6-hydroxy-2-naphthoic acid/4,4'-dihydroxybiphenyl/resorcin/isophthalic acid copolymer
7) 6-hydroxy-2-naphthoic acid/4-hydroxybenzoic acid/4,4'-dihydroxybiphenyl/terephthalic acid copolymer
8) 6-hydroxy-2-naphthoic acid/4-hydroxybenzoic acid/4,4'-dihydroxybiphenyl/2,6-naphthalenedicarboxylic acid copolymer
9) 6-hydroxy-2-naphthoic acid/4-hydroxybenzoic acid/4,4'-dihydroxybiphenyl/isophthalic acid copolymer
10) 6-hydroxy-2-naphthoic acid/4-hydroxybenzoic acid/4,4'-dihydroxybiphenyl/hydroquinone/terephthalic acid copolymer
11) 6-hydroxy-2-naphthoic acid/4-hydroxybenzoic acid/4,4'-dihydroxybiphenyl hydroquinone 2,6-naphthalenedicarboxylic acid copolymer
12) 6-hydroxy-2-naphthoic acid/4-hydroxybenzoic acid/4,4'-dihydroxybiphenyl/hydroquinone/isophthalic acid copolymer
13) 6-hydroxy-2-naphthoic acid/4,4'-dihydroxybiphenyl/hydroquinone terephthalic acid 2,6-naphthalenedicarboxylic acid copolymer
14) 6-hydroxy-2-naphthoic acid/4,4'-dihydroxybiphenyl/hydroquinone/terephthalic acid/isophthalic acid copolymer
15) 6-hydroxy-2-naphthoic acid/4,4'-dihydroxybiphenyl/hydroquinone 2,6-naphthalenedicarboxylic acid/isophthalic acid copolymer
16) 6-hydroxy-2-naphthoic acid/4,4'-dihydroxybiphenyl/resorcin/terephthalic acid/2,6-naphthalenedicarboxylic acid copolymer
17) 6-hydroxy-2-naphthoic acid/4,4'-dihydroxybiphenyl/resorcin/terephthalic acid/isophthalic acid copolymer
18) 6-hydroxy-2-naphthoic acid/4,4'-dihydroxybiphenyl/resorcin/2,6-naphthalenedicarboxylic acid/isophthalic acid copolymer
19) 6-hydroxy-2-naphthoic acid/4,4'-dihydroxybiphenyl/terephthalic acid copolymer
20) 6-hydroxy-2-naphthoic acid/4,4'-dihydroxybiphenyl/2,6-naphthalenedicarboxylic acid copolymer
21) 6-hydroxy-2-naphthoic acid/4,4'-dihydroxybiphenyl/isophthalic acid copolymer
22) 6-hydroxy-2-naphthoic acid/hydroquinone/terephthalic acid copolymer
23) 6-hydroxy-2-naphthoic acid/hydroquinone/2,6-naphthalenedicarboxylic acid copolymer
24) 6-hydroxy-2-naphthoic acid/hydroquinone/isophthalic acid copolymer.

Among the above, the copolymers of 1), 2), 4), 7), 8), 10), 11) and 23) are more preferable.

The liquid-crystalline polyester (B) used for the present invention is a liquid-crystalline polyester wherein the molar proportion of the total amount of the repeating units represented by formulae (I) and (II) based on the total amount of the repeating units constituting the liquid-crystalline polyester (B) is greater than or equal to 90 mol %, and the molar proportion of the repeating units represented by formulae (I) to (II) is from 10/90 to 50/50.

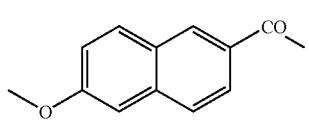
(I)

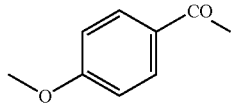
(II)

The type and the composition of the repeating units constituting the liquid-crystalline polyester (B) is not specifically limited as long as the liquid-crystalline polyester (B) contains the repeating units represented by formulae (I) and (II) in the amount and proportion defined above.

The liquid-crystalline polyester (B) used for the present invention may be a combination of two or more liquid-crystalline polyesters and may be a liquid-crystalline polyester blend which is obtained by melt kneading two or more liquid-crystalline polyesters as long as each of the constituting liquid-crystalline polyesters contains the repeating units represented by formulae (I) and (II) in the amount and proportion defined above.

In the liquid-crystalline polyester (B), the total amount of the repeating units represented by formulae (I) and (II) is 90-100 mol %, preferably 95-100 mol % and more preferably 100 mol % based on the total amount of the repeating units constituting the liquid-crystalline polyester (B).

In the liquid-crystalline polyester (B), the relative molar proportion of the repeating unit represented by formula (I) to the repeating unit represented by formula (II) is from 10/90 to 50/50, preferably from 20/80 to 40/60 and more preferably from 25/75 to 30/70.

The liquid-crystalline polyester (B) used for the present invention essentially contains the repeating units represented by formulae (I) and (II) as aromatic oxycarbonyl repeating units. Examples of monomers which provide the repeating unit represented by formula (I) are 6-hydroxy-2-naphthoic acid as well as ester forming derivatives such as acyl derivatives, ester derivatives and acid halide thereof. Examples of monomers which provide the repeating unit represented by formula (II) are 4-hydroxybenzoic acid as well as ester forming derivatives such as acyl derivatives, ester derivatives and acid halide thereof.

Preferable repeating units constituting the liquid-crystalline polyester (B) used for the present invention other than those represented by formulae (I) and (II) are aromatic oxycarbonyl repeating units, aromatic dicarbonyl repeating units, aromatic dioxy repeating units, aromatic aminooxy repeating units, aromatic aminocarbonyl repeating units, aromatic diamino repeating units, aromatic oxydicarbonyl repeating units and aliphatic dioxy repeating units.

Examples of monomers which provide aromatic oxycarbonyl repeating units other than those represented by formulae (I) and (II) are aromatic hydroxycarboxylic acids such as 3-hydroxybenzoic acid, 2-hydroxybenzoic acid, 5-hydroxy-2-naphthoic acid, 3-hydroxy-2-naphthoic acid, 4'-hydroxyphenyl-4-benzoic acid, 3'-hydroxyphenyl-4-benzoic acid, 4'-hydroxyphenyl-3-benzoic acid and alkyl-, alkoxy- or halogen-substituted derivatives as well as ester forming derivatives such as acyl derivatives, ester derivatives and acid halide thereof.

Examples of monomers which provide aromatic dioxy repeating units and aromatic dicarbonyl repeating units are the same as those listed with regard to the liquid-crystalline polyester (A).

Examples of monomers which provide aromatic aminooxy repeating units are aromatic hydroxyamines such as p-aminophenol, m-aminophenol, 4-amino-1-naphthol, 5-amino-1-naphthol, 8-amino-2-naphthol, 4-amino-4'-hydroxybiphenyl and alkyl-, alkoxy- or halogen-substituted derivatives as well as ester and/or amide forming derivatives such as acyl derivatives thereof.

Examples of monomers which provide aromatic aminocarbonyl repeating units are aromatic aminocarboxylic acids such as p-aminobenzoic acid, m-aminobenzoic acid, 6-amino-2-naphthoic acid and alkyl-, alkoxy- or halogen-substituted derivatives as well as ester and/or amide forming derivatives such as acyl derivatives, ester derivatives, and acid halide thereof.

Examples of monomers which provide aromatic diamino repeating units are aromatic diamines such as p-phenylenediamine, m-phenylenediamine, 1,5-diaminonaphthalene, 1,8-diaminonaphthalene and alkyl-, alkoxy- or halogen-substituted derivatives as well as amide forming derivatives such as acyl derivatives thereof.

Examples of monomers which provide aromatic oxydicarbonyl repeating units are hydroxy aromatic dicarboxylic acids such as 3-hydroxy-2,7-naphthalenedicarboxylic acid, 4-hydroxyisophthalic acid, 5-hydroxyisophthalic acid and alkyl-, alkoxy- or halogen-substituted derivatives as well as ester forming derivatives such as acyl derivatives, ester derivatives and acid halide thereof.

Examples of monomers which provide aliphatic dioxy repeating units are aliphatic diols such as ethyleneglycol, 1,4-butanediol, 1,6-hexanediol and acyl derivatives thereof. In addition, the liquid-crystalline polyester having aliphatic dioxy repeating units can be obtained by reacting polyesters having the aliphatic dioxy repeating units such as polyethylene terephthalate and polybutylene terephthalate with the above described aromatic oxycarboxylic acids, aromatic dicarboxylic acids, aromatic diols or acyl derivatives, ester derivatives or acid halide thereof.

The method for preparing the liquid-crystalline polyester (A) and the liquid-crystalline polyester (B) used for the present invention is not limited and any method known to the art can be employed. For example, conventional polymerization methods such as molten acidolysis and slurry polymerization methods for preparing polymer to give ester and/or amide bonding among the above described monomer components may be employed.

The molten acidolysis method is preferably used for preparing the liquid-crystalline polyesters (A) and (B) used for the present invention. In this method, the monomers are heated to give molten solution and then the solution is reacted to give the molten polymer. The final step of this method may be carried out under vacuum to facilitate removal of the volatile by-products such as acetic acid or water.

The slurry polymerization method is characterized in that monomers are reacted in a heat-exchange fluid to give solid state polymer in the form of suspension in the heat-exchange liquid medium.

In either of the molten acidolysis method or the slurry polymerization method, the polymerizing monomer may be in the form of lower acyl derivative obtained by acylating the hydroxyl and/or amino group. The lower acyl group may have preferably 2-5, more preferably 2-3 carbon atoms. Acetylated monomers are most preferably used for the reaction.

The lower acyl derivatives of the monomers may be those prepared beforehand by acylating the monomers independently or may be those produced in the reaction system by adding an acylating agent such as acetic anhydride to the monomers upon preparing the liquid-crystalline polyesters (A) and (B).

In either of the molten acidolysis method or the slurry polymerization method, a catalyst may be used in the reaction, if desired.

Examples of the catalysts include organic tin compounds such as dialkyl tin oxide (ex. dibutyl tin oxide) and diaryl tin oxide; organic titanium compounds such as alkoxy titanium silicate and titanium alkoxide; titanium dioxide; antimony trioxide; alkaline or alkaline earth metal salt of carboxylic acid such as potassium acetate; salts of inorganic acid (ex. $K_2SO_4$); Lewis acid (ex. $BF_3$); and gaseous acid catalysts such as and halogenated hydrogen (ex. HCl).

When a catalyst is used, the amount of the catalyst added to the reaction based on the total monomers may preferably be 10-1000 ppm, and more preferably 20-200 ppm.

The liquid-crystalline polyester (A) and the liquid-crystalline polyester (B) used for the present invention may be obtained from the polymerizing reaction vessel in molten state and processed to give pellets, flakes or powders.

Thereafter, the liquid-crystalline polyester (A) and the liquid-crystalline polyester (B) may be subjected to the solid phase heating process in vacuum or under inert gas atmospheres such as nitrogen gas and helium gas in order to improve heat resistance and the like, if desired.

The liquid-crystalline polyester blend of the present invention is obtained by combining the liquid-crystalline polyester (A) and the liquid-crystalline polyester (B). The liquid-crystalline polyester blend of the present invention may be obtained by melt kneading the mixture of the liquid-crystalline polyester (A) and the liquid-crystalline polyester (B) using a kneading machine such as Banbury mixer, kneader, single screw extruder, twin screw extruder or the like.

The ratio by weight of the liquid-crystalline polyester (A) to the liquid-crystalline polyester (B) is from 99/1 to 80/20, preferably from 95/5 to 80/20 and more preferably from 90/10 to 80/20.

When the ratio by weight of the liquid-crystalline polyester (A) to the liquid-crystalline polyester (B) is more than 99/1, the resulting liquid-crystalline polyester blend tends to exhibit less improved flowability and processability at low temperatures and when the ratio by weight of the liquid-crystalline polyester (A) to the liquid-crystalline polyester (B) is less than 80/20, the resulting liquid-crystalline polyester blend tends to exhibit insufficient impact strength.

The liquid-crystalline polyester blend of the present invention consisting of the liquid-crystalline polyester (A) and the liquid-crystalline polyester (B) exhibits a melting temperature of preferably less than 350° C., more preferably less than 340° C. and even more preferably less than 330° C. and a deflection temperature under load of preferably 250-310° C., more preferably 270-310° C. and even more preferably 280-310° C. The liquid-crystalline polyester blend of the present invention exhibits good balance of molding processability and heat resistance.

The liquid-crystalline polyester blend of the present invention exhibits small dielectric loss tangent in high frequency regions such as gigahertz bands. Specifically, the dielectric loss tangent measured at the frequency of 1 GHz is preferably less than or equal to 0.001 and more preferably less than or equal to 0.0008.

The dielectric loss tangent of the liquid-crystalline polyester blend of the present invention can be measured by resonant cavity perturbation method.

Further, the Izod impact strength of the liquid-crystalline polyester blend of the present invention measured according to ASTM D256 using the bending test piece with length of 63.5 mm, width of 12.7 mm and thickness of 3.2 mm is preferably greater than or equal to 200 J/m, more preferably greater than or equal to 220 J/m and even more preferably greater than or equal to 250 J/m and therefore, it exhibits an excellent Izod impact strength.

The present invention further provides a liquid-crystalline polyester blend composition comprising the liquid-crystalline polyester blend consisting of the liquid-crystalline polyester (A) and the liquid-crystalline polyester (B) of the present invention and other ingredients such as inorganic and/or organic filler.

Examples of inorganic and/or organic fillers may include glass fiber, silica-alumina fiber, alumina fiber, carbon fiber, potassium titanate fiber, aluminium borate fiber, aramid fiber, talc, mica, graphite, wollastonite, dolomite, clay, glass flake, glass beads, glass balloon, calcium carbonate, barium sulfate and titanium oxide. Among them, glass fiber is preferably used because of its good balance of physical properties and cost.

The inorganic and/or organic fillers may be added to the liquid-crystalline polyester blend composition of the present invention in an amount of 0.1-200 parts by weight, preferably 1-100 parts by weight per 100 parts by weight of the total weight amount of the liquid-crystalline polyester (A) and the liquid-crystalline polyester (B).

If the amount of the inorganic and/or organic fillers is more than 200 parts by weight, the moldability of the resulting liquid-crystalline polyester blend composition tends to be decreased or the exhausting of the cylinder or die of the molding device tends to be increased.

The liquid-crystalline polyester blend or the liquid-crystalline polyester blend composition according to the present invention may further be admixed with one or more additives, if desired. For example, molding lubricant such as higher aliphatic acid, higher aliphatic ester, higher aliphatic amide, higher aliphatic acid metal salt, polysiloxane and fluorocarbon resin; colorant such as dyes and pigments; antioxidant; thermal stabilizer; UV absorbent; antistatic agent; and surface active agent may be admixed. The term "higher" group herein used refers to the group of 10-25 carbon atoms.

Molding lubricants such as higher aliphatic acid, higher aliphatic ester, higher aliphatic acid metal salt or fluorocarbon-type surfactant may be added to the pellets of the liquid-crystalline polyester blend or the liquid-crystalline polyester blend composition before subjecting the pellets to the molding process, so that the agent adhere to the outer surface of the pellet.

The liquid-crystalline polyester blend or the liquid-crystalline polyester blend composition of the present invention may comprise one or more additional resin component which can be subjected to processing such as molding at the same range of the temperatures as the liquid-crystalline polyester blend of the present invention, unless the additional resin component does not impair the object of the present invention. Examples of the additional resin components include thermoplastic resins such as polyamide, polyester, polyacetal, polyphenylene ether and denatured derivatives thereof, polysulfone, polyethersulfone, polyether imide and polyamideimide, and thermosetting resins such as phenol resin, epoxy resin and polyimide resin. The amount of the additional resin components is not limited, and may be determined dependent on the intended property. Typically, such additional resins may be added to the liquid-crystalline polyester blend or the liquid-crystalline polyester blend composition in an amount of 0.1-100 parts by weight, preferably 0.1-80 parts by weight per 100 parts by weight of the total weight amount of the liquid-crystalline polyester (A) and liquid-crystalline polyester (B).

The liquid-crystalline polyester blend composition of the present invention may be obtained by adding the inorganic and/or organic fillers, additives and other resin components to the liquid-crystalline polyester blend consisting of the liquid-crystalline polyester (A) and the liquid-crystalline polyester (B) of the present invention and melt kneading the mixture using a kneading machine such as Banbury mixer, kneader, single screw extruder, twin screw extruder or the like.

The inorganic and/or organic fillers, additives and other resin components may be added to the liquid-crystalline polyester blend consisting of the liquid-crystalline polyester (A) and the liquid-crystalline polyester (B) and may be admixed to the molten mixture of the liquid-crystalline polyester (A) and the liquid-crystalline polyester (B) upon melt kneading.

The liquid-crystalline polyester blend or the liquid-crystalline polyester blend composition of the present invention may be processed in a conventional manner to give molded article, film, sheet, bonded textile and the like. For example, injection molding or extrusion techniques may be preferably used.

The liquid-crystalline polyester blend or the liquid-crystalline polyester blend composition of the present invention exhibits excellent dielectric properties in high frequency regions as well as high impact strength and good molding processability and therefore, is suitably used for manufacturing electronic parts of antenna, connector, substrate and the like which use high frequency signals.

The present invention is further described in reference to the following Examples.

In the Examples and Comparative Examples, melting temperature (Tm), deflection temperature under load (DTUL), tensile strength, flexural strength, Izod impact strength, and dielectric loss tangent (tan δ) are assessed by the following procedures.

1) Melting Temperature (Tm)

The differential scanning calorimeter Exstar 6000 (Seiko Instruments Inc., Chiba, Japan) or the same type of DSC device is used. The LCP or LCP blend sample to be examined is heated from a room temperature at a rate of 20° C./minute and endothermic peak (Tm1) is recorded. Thereafter, the sample is kept at a temperature 20-50° C. higher than Tm1 for 10 minutes. Then the sample is cooled to room temperature at the rate of 20° C./minute. Then, the sample is heated again at a rate of 20° C./minute. Endothermic peak found in the final step is recorded as melt point (Tm) of a liquid-crystalline polyester or a liquid-crystalline polyester blend.

2) Deflection Temperature Under Load (DTUL)

Test piece with length of 127 mm, width of 12.7 mm and thickness of 3.2 mm was molded from a liquid-crystalline polyester blend or a liquid-crystalline polyester using injection molding machine (UH 1000-110, Nissei Plastic Industrial Co., Ltd). Deflection temperature was measured using the test piece according to ASTM D648 under load of 1.82 MPa and heating rate of 2° C./min.

3) Tensile Strength

A dumbbell-shaped specimen with thickness of 2.0 mm shown in FIG. 1 was molded from a liquid-crystalline polyester blend or a liquid-crystalline polyester using injection molding machine (MINIMAT M 26/15, Sumitomo Heavy Industries, Ltd.) with a clamping pressure of 15 ton, cylinder temperature of 350° C. and die temperature of 70° C. Tensile strength was measured using the specimen by using INSTRON5567 (Universal testing machine, Instron Japan Co., Ltd.) with span distance of 25.4 mm and pulling rate of 5 mm/min.

4) Flexural Strength

Bending test piece with length of 127 mm, width of 12.7 mm and thickness of 3.2 mm was molded from a liquid-crystalline polyester blend or a liquid-crystalline polyester using injection molding machine (MINIMAT M26/15, Sumitomo Heavy Industries, Ltd.) with clamping pressure of 15 ton, cylinder temperature of 350° C. and die temperature of 70° C. Flexural strength was measured according to ASTM D790.

5) Izod Impact Strength

The central part of the same test piece as that used for measuring deflection temperature under load was vertically cut in the length direction to give the test piece with length of 63.5 mm, width of 12.7 mm, and thickness of 3.2 mm. Izod impact strength was measured according to ASTM D256 using the test piece.

6) Dielectric Loss Tangent (tan δ)

Stick-shaped test piece with length of 85 mm, width of 1.75 mm and thickness of 1.75 mm was molded from a liquid-crystalline polyester blend or a liquid-crystalline polyester using injection molding machine (PS40, Nissei Plastic Industrial Co., Ltd.). The dielectric loss tangent at 1 GHz was measured using the test piece with vector network analyzer (Agilent Technologies Japan, Ltd.) according to resonant cavity perturbation method.

In the Synthesis Examples and Examples, following abbreviations are used.

[Liquid-Crystalline Polyester Resin Monomer]
BON6: 6-hydroxy-2-naphthoic acid
POB: 4-hydroxybenzoic acid
BP: 4,4'-dihydroxybiphenyl
HQ: hydroquinone
TPA: terephthalic acid

SYNTHESIS EXAMPLE 1

The Synthesis of LCP-I (Liquid-Crystalline Polyester (A))

BON6, BP, HQ and TPA were fed in a reaction container equipped with an agitating device with torque-meter and a condenser in the ratio shown in table 1 so that the total monomer amount was 1840 mol. Then potassium acetate 7.55 g (22.6 ppm to the total amount of the monomers) and acetic anhydride 1.03 fold moles to the total amount (moles) of hydroxy groups of the monomers were added to the container. The mixture was polymerized under the following condition.

TABLE 1

| Synthesis Example 1, monomer ratio | | | | |
|---|---|---|---|---|
| | BON6 | BP | HQ | TPA |
| kg | 187.2 | 73.8 | 3.1 | 70.3 |
| mol % | 54 | 21.5 | 1.5 | 23 |

Under the nitrogen atmosphere, the mixture was heated from room temperature to 150° C. over 1 hour and kept at 150° C. for 60 minutes, then heated to 350° C. over seven hours with distilling out the by-product acetic acid. Then the pressure was reduced to 10 mmHg over 90 minutes. When the torque became the predetermined level, the polymerizing reaction was terminated. The resulting polymer was removed from the container as strands and the strands were cut to give pellets of a liquid-crystalline polyester. As a result, approximately theoretical amount of acetic acid was distilled out.

SYNTHESIS EXAMPLE 2

Synthesis of LCP-II (Liquid-Crystalline Polyester (B))

POB and BON6 were fed in a reaction container equipped with an agitating device with torque-meter and a condenser in the ratio shown in table 2 so that the total monomer amount was 1840 mol. Acetic anhydride 1.03 fold moles to the total amount (moles) of hydroxy groups of the monomers were added to the container. The mixture was polymerized under the following condition.

TABLE 2

| Synthesis Example 2, monomer ratio | | |
|---|---|---|
| | POB | BON6 |
| kg | 185.7 | 93.6 |
| mol % | 73 | 27 |

Under the nitrogen atmosphere, the mixture was heated from room temperature to 150° C. over 1 hour and kept at 150° C. for 30 minutes, then rapidly heated to 210° C. with distilling out the by-product acetic acid. Then the mixture was kept at 210° C. for 30 minutes. Thereafter, the mixture was heated to 325° C. over five hours. Then the pressure was reduced to 20 mmHg over 90 minutes. When the torque became the predetermined level, the polymerizing reaction was terminated. The resulting polymer was removed from the container as strands and the strands were cut to give pellets of a liquid-crystalline polyester. As a result, approximately theoretical amount of acetic acid was distilled out.

SYNTHESIS EXAMPLE 3

Synthesis of LCP-III

BON6, POB, BP, HQ and TPA were fed in a reaction container equipped with an agitating device with torque-meter and a condenser in the ratio shown in table 3 so that the total monomer amount was 1840 mol. Acetic anhydride 1.03 fold moles to the total amount (moles) of hydroxy groups of the monomers were added to the container. The mixture was polymerized under the same condition as that of Synthesis Example 1 to give pellets of a liquid-crystalline polyester. As a result, approximately theoretical amount of acetic acid was distilled out.

TABLE 3

| Synthesis Example 3, monomer ratio | | | | | |
|---|---|---|---|---|---|
| | BON6 | POB | BP | HQ | TPA |
| kg | 171.2 | 30.8 | 60.4 | 2.4 | 60.3 |
| mol % | 49.4 | 12.1 | 17.6 | 1.2 | 19.7 |

SYNTHESIS EXAMPLE 4

Synthesis of LCP-IV

BON6, BP and TPA were fed in a reaction container equipped with an agitating device with torque-meter and a condenser in the ratio shown in table 4 so that the total monomer amount was 1840 mol. Then potassium acetate 7.60 g (22.6 ppm to the total amount of the monomers) and acetic anhydride 1.03 fold moles to the total amount (moles) of hydroxy groups of the monomers were added to the container. The mixture was polymerized under the same condition as that of Synthesis Example 1 to give pellets of a liquid-crystalline polyester. As a result, approximately theoretical amount of acetic acid was distilled out.

TABLE 4

Synthesis Example 4, monomer ratio

|  | BON6 | BP | TPA |
|---|---|---|---|
| kg | 187.2 | 79.0 | 70.3 |
| mol % | 54 | 23 | 23 |

EXAMPLES 1-3 AND COMPARATIVE EXAMPLES 1 AND 2

LCP-I and LCP-II were mixed in the ratio by weight shown in Table 5 and the mixture was melt kneaded using twin screw extruder TEX-30 (The Japan Steel Works, LTD.) at 350° C. to give pellets of a liquid-crystalline polyester blend.

COMPARATIVE EXAMPLES 3-6

The liquid-crystalline polyesters LCP-I to LCP-IV obtained by the Synthesis Examples 1-4 without blending were subjected to the measurements of melting temperature, deflection temperature under load, tensile strength, flexural strength, Izod impact strength and dielectric loss tangent by the same method as Example 1. The results are shown in Table 5.

Comparing Examples 1 to 3 and Comparative Examples 1 to 3, it is found that the liquid-crystalline polyester blends comprising LCP-II (Comparative Example 4) in amounts of up to 20 wt % of LCP-I (Comparative Example 3) exhibited good mechanical properties such as tensile strength and flexural strength and small dielectric loss tangent (tan δ) as shown by LCP-I and dramatically improved Izod impact strength.

Further, comparing Example 2 and Comparative Example 5, it is found that the liquid-crystalline polyester blend of Example 2 which was obtained by blending LCP-I and LCP-II exhibited superior properties including deflection temperature under load (heat resistance), tensile strength, flexural strength and Izod impact strength to the liquid-crystalline polyester (LCP-IV) of Comparative Example 5, though the monomer ratios of these two polyesters are approximately the same.

What is claimed is:

1. A liquid-crystalline polyester blend, which is obtained by combining a liquid-crystalline polyester (A) and a liquid-crystalline polyester (B) such that the ratio by weight of (A)/(B) is 99/1 to 80/20:
   liquid-crystalline polyester (A) which consists of aromatic oxycarbonyl repeating units, aromatic dioxy repeating units and aromatic dicarbonyl repeating units, and contains 40-80 mol% of the repeating unit represented by formula (I) based on the total repeating units constituting the liquid-crystalline polyester (A);
   wherein the aromatic oxycarbonyl repeating unit contained in the liquid crystalline polyester (A) is solely the unit represented by formula (I),
   liquid-crystalline polyester (B) which comprises repeating units represented by formulae (I) and (II), wherein the molar proportion of the total amount of the repeating units represented by formulae (I) and (II) based on the total amount of the repeating units constituting the liquid-crystalline polyester (B) is equal to 100 mol % and the molar proportion of the repeating units represented by formulae (I) to (II) is from 10/90 to 50/50,

TABLE 5

Physicalities of the liquid-crystalline polyester blends and the liquid-crystalline polyesters

|  |  | Example | | | Comparative Example | | | | | |
|---|---|---|---|---|---|---|---|---|---|---|
|  |  | 1 | 2 | 3 | 1 | 2 | 3 | 4 | 5 | 6 |
| Monomer ratio (mol %) *1 | BON6 | 50.8 | 49.5 | 48.7 | 46.2 | 39.1 | 54 | 27 | 49.4 | 54 |
|  | POB | 8.7 | 12.1 | 14.3 | 21.2 | 40.2 | — | 73 | 12.1 | — |
|  | BP | 18.9 | 17.9 | 17.3 | 15.2 | 9.7 | 21.5 | — | 17.6 | 23 |
|  | HQ | 1.3 | 1.3 | 1.2 | 1.1 | 0.7 | 1.5 | — | 1.2 | — |
|  | TPA | 20.3 | 19.2 | 18.5 | 16.3 | 10.3 | 23 | — | 19.7 | 23 |
| blend ratio (wt %) | LCP-I | 90 | 86 | 83.3 | 75 | 50 | 100 | — | — | — |
|  | LCP-II | 10 | 14 | 16.7 | 25 | 50 | — | 100 | — | — |
|  | LCP-III | — | — | — | — | — | — | — | 100 | — |
|  | LCP-IV | — | — | — | — | — | — | — | — | 100 |
| Tm (° C.) |  | 315 | 313 | 309 | 308 | 280 | 343 | 280 | 277 | 352 |
| DTUL (° C.) |  | 275 | 270 | 274 | 277 | 234 | 307 | 180 | 151 | 342 |
| Tensile strength (MPa) |  | 270 | 290 | 277 | 252 | 245 | 271 | 290 | 276 | 149 |
| Flexural strength (MPa) |  | 208 | 209 | 220 | 195 | 190 | 204 | 165 | 185 | 210 |
| Izod (J/m) |  | 275 | 277 | 255 | 138 | 148 | 170 | 300 | 190 | 78 |
| tan δ (×10$^{-3}$) *2 |  | 0.4 | 0.4 | 0.5 | 1.1 | 1.2 | 0.5 | 1.3 | 0.7 | 0.6 |

*1: Monomer ratio is a value after blending with regard to Examples 1 to 3 and Comparative Examples 1 and 2.
*2: tan δ is a value measured at 1 GHz.

wherein the deflection temperature under load of the liquid-crystalline polyester blend is 250-310° C., and wherein the dielectric loss tangent of the liquid-crystalline blend measured at a frequency of 1 GHz using a stick-shaped test piece with a length of 85 mm, width of 1.75 mm and thickness of 1.75 mm is less than or equal to 0.001:

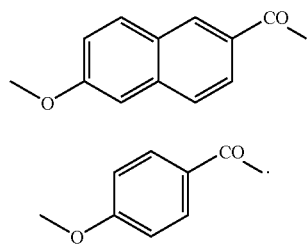

(I)

(II)

2. The liquid-crystalline polyester blend according to claim 1, wherein the aromatic dioxy repeating unit contained in the liquid-crystalline polyester (A) is at least one repeating unit which is selected from the group consisting of the repeating units represented by the following formulae (1) to (3) and the aromatic dicarbonyl repeating unit contained in the liquid-crystalline polyester (A) is at least one repeating unit which is selected from the group consisting of the repeating units represented by the following formulae (4) to (6)

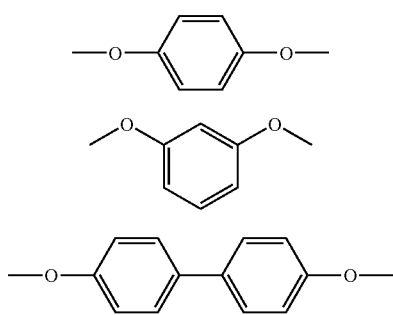

(1)

(2)

(3)

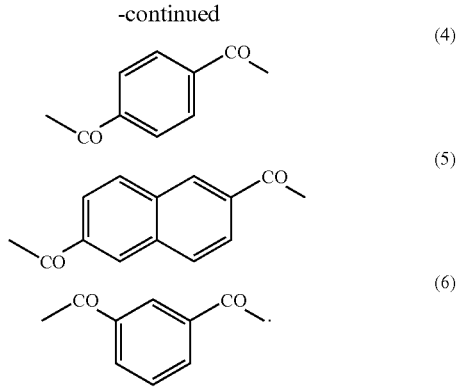

(4)

(5)

(6)

3. The liquid-crystalline polyester blend according to claim 1, wherein the melting point determined using differential scanning calorimeter (DSC) is lower than 350° C.

4. The liquid-crystalline polyester blend according to claim 1, wherein the Izod impact strength measured according to ASTM D256 using the bending test piece with length of 63.5 mm, width of 12.7 mm and thickness of 3.2 mm is greater than or equal to 200 J/m.

5. A liquid-crystalline polyester blend composition comprising 100 parts by weight of the liquid-crystalline polyester blend according to claim 1 and 0.1-200 parts by weight of at least one inorganic and/or organic filler.

6. The liquid-crystalline polyester blend composition according to claim 5, wherein the inorganic and/or organic filler is selected from the group consisting of glass fiber, silica-alumina fiber, alumina fiber, carbon fiber, potassium titanate fiber, aluminium borate fiber, aramid fiber, talc, mica, graphite, wollastonite, dolomite, clay, glass flake, glass beads, glass balloon, calcium carbonate, barium sulfate, titanium oxide and a combination thereof.

7. The liquid-crystalline polyester blend composition according to claim 6, wherein the inorganic filler is glass fiber.

8. A molded article obtainable by molding the liquid-crystalline polyester blend according to claim 1.

9. The molded article according to claim 8, which is antenna, connector or substrate.

10. A molded article obtainable by molding the liquid-crystalline polyester blend composition according to claim 5.

* * * * *